United States Patent [19]

Liu et al.

[11] Patent Number: 5,760,682

[45] Date of Patent: Jun. 2, 1998

[54] METHOD FOR DETECTING A DEFLATED TIRE ON A VEHICLE

[75] Inventors: John Yong Liu, Torrance, Calif.; Frank Sager, Swisttal, Germany

[73] Assignee: Robert Bosch GmbH, Stuttgart, Germany

[21] Appl. No.: 812,584

[22] Filed: Mar. 7, 1997

[51] Int. Cl.$^6$ .................................................. B60C 23/00
[52] U.S. Cl. ............................. 340/444; 340/442; 340/671; 73/146.5
[58] Field of Search ................................. 340/438, 442, 340/444, 671, 439; 73/146.2, 146, 146.5; 364/426.01, 426.02, 426.03, 424.03

[56] References Cited

U.S. PATENT DOCUMENTS

| | | | |
|---|---|---|---|
| 4,876,528 | 10/1989 | Walker et al. | 340/442 |
| 5,483,220 | 1/1996 | Kushimoto et al. | 170/775 |
| 5,578,984 | 11/1996 | Nakajima | 340/444 |
| 5,589,816 | 12/1996 | Jones | 340/444 |
| 5,614,882 | 3/1997 | Latarnik et al. | 340/442 |
| 5,629,478 | 5/1997 | Nakajima et al. | 73/146.2 |

FOREIGN PATENT DOCUMENTS 2226434  6/1990  United Kingdom ............ B60C 23/00

OTHER PUBLICATIONS

Walpole et al., Probability and Statistics for Engineers and Scientists 2Ed. pp. 365–375.

Primary Examiner—Jeffrey A. Hofsass
Assistant Examiner—Daniel J. Wu
Attorney, Agent, or Firm—Felfe & Lynch

[57] ABSTRACT

Wheel speed values for each of four wheels are collected and analyzed for a statistical variation which would indicate low tire pressure. Prior to analysis, and following reset of the system, calibration factors are determined for each of the wheels to compensate rolling radius variations, and subsequently used to correct all wheel speed values. The corrected speed values are then filtered to exclude values which represent wheel slippage, rough road fluctuations, vehicle cornering, and uphill or downhill travel. When a sufficient number of values have been collected, an F-value is calculated substantially according to the statistical method "analysis of the variance", and the F-value is compared to an empirically determined value corresponding to a predetermined pressure loss. This comparison can provide the basis for a driver warning. Since a larger F-value indicates a larger statistical difference in wheel speeds, the value can be rechecked after a further interval for additional pressure loss.

17 Claims, 4 Drawing Sheets

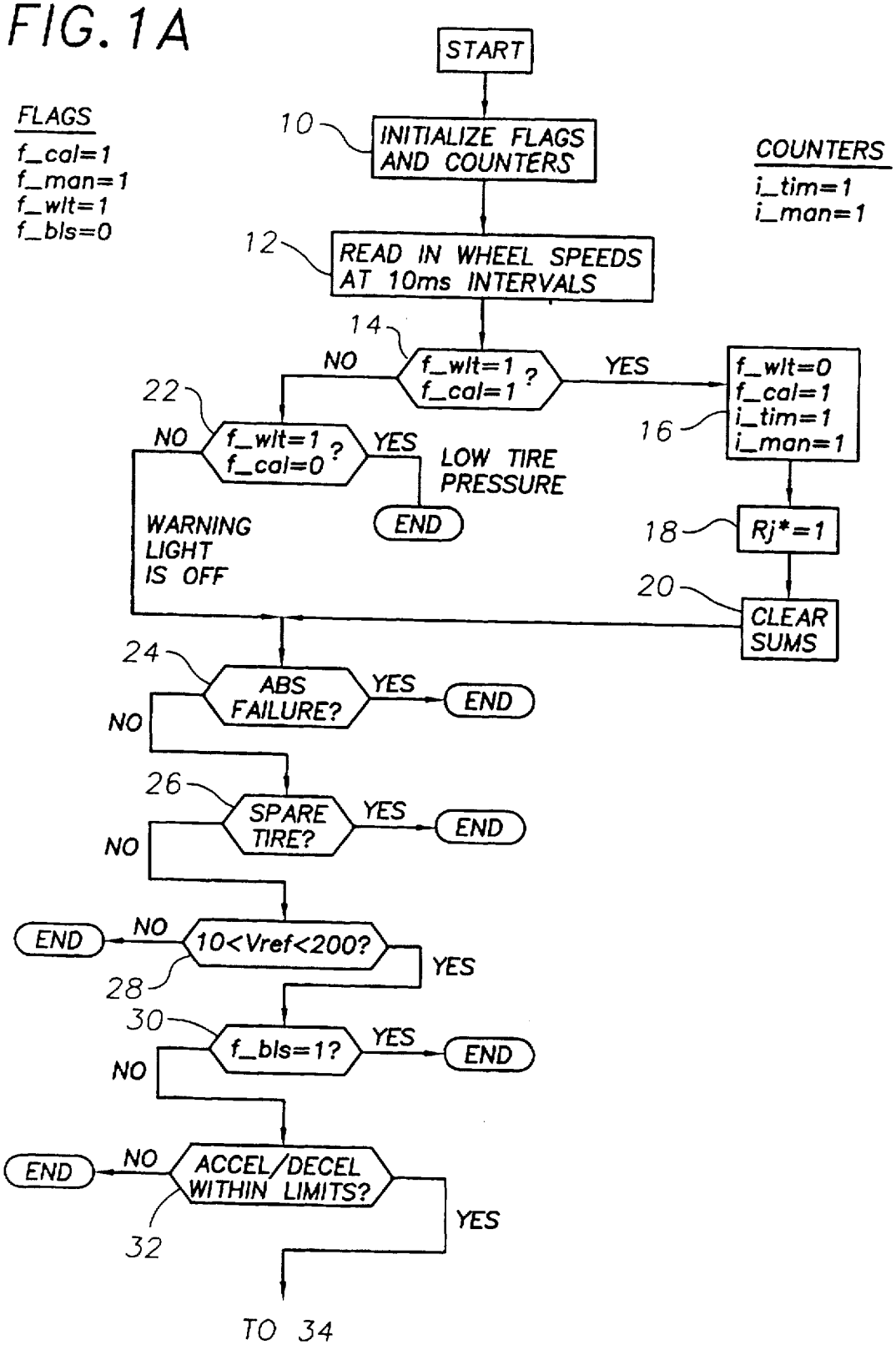

METHOD FOR DETECTING A DEFLATED TIRE ON A VEHICLE

BACKGROUND OF THE INVENTION

The invention relates to a method of detecting when the air pressure in a tire has fallen below a predetermined pressure level, based on the measured wheel speeds.

Devices for directly measuring the air pressure in a tire traditionally involve a sensor in the tire, and transmit an electrical signal through slip rings at the hub or by radio transmission. Such devices are expensive and unreliable, particularly in the hostile environment of a vehicle wheel.

With the advent of ABS and the placement of speed sensing devices at each of the wheels, efforts have been made to use the wheel speed data to determine when a tire is low on air. This determination is based on the principle that pressure loss on running wheels can reduce the rolling radii of the tires in very small magnitudes, and therefore increase the measured wheel speeds. Such systems may not involve any additional hardware beyond a low pressure warning device, and are thus economic and reliable.

G.B. 2,226,434 discloses a system which assumes that all wheel speeds will be the same so long as they have the same effective diameter and the vehicle is travelling in a straight line. Disturbances in the wheel speed signals are not filtered out, but rather are averaged in over a period of time to minimize their effects. Deflation is indicated when a difference in wheel speeds is detected.

U.S. Pat. No. 4,876,528 discloses a method wherein signals proportional to the measured angular velocities of the wheels are arithmetically processed to generate magnitudes which are compared with thresholds to determine when a tire is deflated relative to the other tires. Like some other known methods, the difference between the sums of speeds of diagonally opposed pairs of wheels is a critical magnitude.

U.S. Pat. No. 5,483,220 discloses a hybrid method using a device which directly detects the pressure of the tire on one wheel, and measures the angular velocities of all wheels. When the directly detected pressure is low, a warning device is operated. When the detected pressure is normal, ratios of the angular velocities of the other wheels to the angular velocity of the detected wheel are evaluated to determine when a tire on one of the other wheels is deflated. The system offers the advantage of evaluating real pressure as opposed to relative pressure, but requires a pressure sensor and signal transmission means.

Notwithstanding the reliability and economic appeal of tire inflation monitoring based on wheel speeds, the accuracy of these systems leaves room for improvement. Provision needs to be made for calibrating the speeds to adjust for different rolling radii, disregarding disturbed values, and disregarding values which are measured during vehicle maneuvers.

SUMMARY OF THE INVENTION

The method according to the invention isolates usable wheel speed data from data corrupted by built-in wheel radius variations and vehicle driving maneuvers. The data is used to calculate a single number, the so-called F-value, to detect significant wheel differences and consequently to detect low tire pressure.

The F-value is calculated from the wheel speed signals $V_{ij}$ which are available in antilock brake system (ABS). Under perfect driving conditions, i.e., no slip, straight line driving, and constant rolling radii, $$V_{i1}R_{i1}=V_{i2}R_{i2}=V_{i3}R_{i3}=V_{i4}R_{i4}=V_{i,ref}$$

Here $V_{ij}$ are the wheel speeds (m/sec), $R_{ij}$ are the radii (m), and $V_{i,ref}$ is the vehicle velocity (m/sec). The measured wheel speed signals over a given time interval may be arranged in four columns and in rows as follows:

| $V_{11}$ | $V_{12}$ | $V_{13}$ | $V_{14}$ |
|---|---|---|---|
| ... | ... | ... | ... |
| $V_{i1}$ | $V_{i2}$ | $V_{i3}$ | $V_{i4}$ |
| ... | ... | ... | ... |
| $V_{n1}$ | $V_{n2}$ | $V_{n3}$ | $V_{n4}$ |

The statistical method "analysis of the variance", can be used optimally to test if the four wheel speed columns are statistically similar or not. It also provides a quantitative way to measure the differences among the four wheel speed signals measured over a time interval. If each wheel speed signal is treated as an independent sample set, the four wheel speed columns should be statistically the same, after discounting measurement noise and road noise provided the linear speed at the center of each wheel is the same. The magnitude of a statistical measure of the difference, characterized by the F-value, is then used for the angular wheel speed difference identification. By first identifying sources of rolling radius perturbations other than tire pressure loss, the angular wheel speed difference can be isolated to indicate pressure loss of a tire.

The F-test is a statistical method to test how different sample sets of an event are from each other. This method is better than the conventional means value comparison method because it takes the standard deviation into consideration as a measure of the difference. It has the advantages over a plausibility check in that (1) it is optimal in a mathematical sense, i.e., it can identify speed differences where other methods cannot and (2) it is simple and RAM efficient in implementation.

The calculation of an F-value according to "Analysis of the Variance", also known as ANOVA, is described in statistics texts. See for example, Walpole et al., Probability and Statistics for Engineers and Scientists, pp. 365–374. The F-value is calculated as follows:

$$X = \sum_{i=1}^{n} \left( \sum_{j=1}^{4} V_{ij} \right) /4n \text{ Grand mean}$$

$$X_j = \left( \sum_{i=1}^{n} V_{ij} \right) /n \text{ Sample mean}$$

$$SSC = \sum_{i=1}^{n} \left( \sum_{j=1}^{4} (X_j - X)^2 \right) \begin{array}{l}\text{Between column variation}\\ \text{(sum of squares for treatments)}\end{array}$$

$$SSR = \sum_{i=1}^{n} \left( \sum_{j=1}^{4} (X_j - V_{ij})^2 \right) \begin{array}{l}\text{Overall variation}\\ \text{(sum of squares for errors)}\end{array}$$

$$S_t^2 = SSC/(4-1)$$
$$S_p^2 = SSR/4(n-1)$$
$$F = S_t^2/S_p^2 = [SSC/(4-1)]/[SSR/4(n-1)]$$

According to the present invention, F is calculated using a somewhat formulation of the same equations different to limit RAM storage. That is, within a certain period of time, both $$SUMV_j = \sum_{i=1}^{n} (V_{ij}) \text{ and}$$

-continued $$SUM2V_j = \sum_{i=1}^{n} (V_{ij}^2)$$

are saved for each wheel. Then $$X = SUMV_1 + SUMV_2 + SUMV_3 + SUMV_4$$

$$SSC = \sum_{j=1}^{4} (4SUMV_j - X)^2$$

$$SSR = \sum_{j=1}^{4} (SUM2V_j) - \sum_{j=1}^{4} (SUMV_j)^2$$

$$F = SSC/SSR$$

An F-value so calculated satisfies the so-called F distribution curve. If there is no significant difference among the four columns, F should be close to one. If there is a significant difference between any two columns, the two different estimations of variance will be significantly different, with $S_r^2 > S_p^2$, thus yielding a larger F-value. This value can be compared to an empirically determined value corresponding to a given pressure loss, and a driver warning device can be actuated when the predetermined value is exceeded.

Prior to calculating the F-value, a calibration procedure is used to produce calibration factors, which are then used to modify the measured wheel speeds in order to discount static or built-in rolling radius variations. A least-square method is used to obtain these calibration factors. In general, the least-square method is a systematic way to optimally estimate the solution of a set of linear equations which are otherwise not exactly solvable. Use of the least-square method in obtaining the relative tire rolling radii over a given wheel speed data set yields minimal error and is also simple in implementation and RAM efficient. The set of wheel speed equations with equal tire pressure on straight-line and level surface over a certain period of time can be written as $$V_{1j}R_{1j} = V_{1,ref}$$

$$\vdots$$

$$V_{ij}R_{ij} = V_{i,ref}$$

$$\vdots$$

$$V_{nj}R_{nj} = V_{n,ref}$$

Due to the built-in variations, it cannot be assumed that the rolling radii of different wheels are exactly the same, nor can it be assumed that rolling radius of each wheel is constant over the time. For each wheel, to find an optimal estimation of the rolling radius, the least-square method is used. A solution of $R_j^*$ is the least-square solution if it satisfies $$\sum_{i=1}^{n} (V_{i,ref} - V_{ij}R_j^*)^2 = min_{anyR} \sum_{i=1}^{n} (V_{i,ref} - V_{ij}R)^2$$

After the wheel speed calibration factors are obtained, the wheel speed signals are calibrated:

$$V_{ij}^{cor} = R_j^* V_{ij}$$

It is these corrected signals $V_{ij}^{cor}$ which are used to calculate the F value.

Prior to correction and speed difference identification, all measured wheel speeds are normalized by a reference speed $V_{i,ref}$ which can be calculated as (e.g.) the average of the angular wheel speeds times a virtual tire radius:

$$V_{i,ref} = (V_{i1} + V_{i2} + V_{i3} + V_{i4})R/4$$

$$V_{ij}^{nor} = V_{ij}/V_{i,ref}$$

Note that the normalization of wheel speeds does not affect the result of the analysis of the variance, nor the F-value. For calibration purposes, the optimal solution for the rolling radius $R_j^*$ is $$R_j^* = \left( \sum_{i=1}^{n} V_{ij}^{nor} \right) / \sum_{i=1}^{n} (V_{ij}^{nor})^2$$

Maneuver Detection

To further distinguish the wheel speed difference caused by pressure loss from differences caused by other sources, a dynamic filtering process is used to exclude wheel speed data collected during various vehicle maneuvers. For that purpose, the algorithm according to the invention includes (1) wheel acceleration and deceleration filtering, (2) turning fluctuation filtering, and (3) rough road filtering, at the ABS sampling period (10 milli-second) level. Additionally, (1) a cornering detection routine and (2) an uphill/downhill (vehicle acceleration/deceleration) detection routine are effective over a certain number of sampling periods, for example 10 (100 ms) For cornering, the difference between the linear speeds at the center of the right and left side wheels is proportional to vehicle speed and inversely proportional to cornering radius:

$$V_L R_L - V_R R_R = V_{ref} l/r$$

where r is the cornering radius and l the track width. Wheel speed difference obtained under this driving condition cannot be used to identify pressure loss due to the corruption by cornering. The algorithm identifies cornering by recognizing similar wheel speed difference patterns at both front and rear axles, and excludes the data collected under these conditions from entering the detection process. For constant speed uphill/downhill driving, the engine torque creates larger (less) tire slip on the driven axle than on the non-driven axle in the uphill (downhill) situation; wheel speed difference obtained under these driving conditions cannot be used to identify pressure loss. The algorithm identifies uphill/downhill situation by recognizing similar wheel speed difference patterns at both left and right sides, and excludes the data collected under these conditions from entering the detection process.

BRIEF DESCRIPTION OF THE DRAWING

FIGS. 1a, 1b and 1c represent a flow chart of a preferred method according to the invention in three parts.

DETAILED DESCRIPTION OF THE PREFERRED EMBODIMENT

Figure 1B:
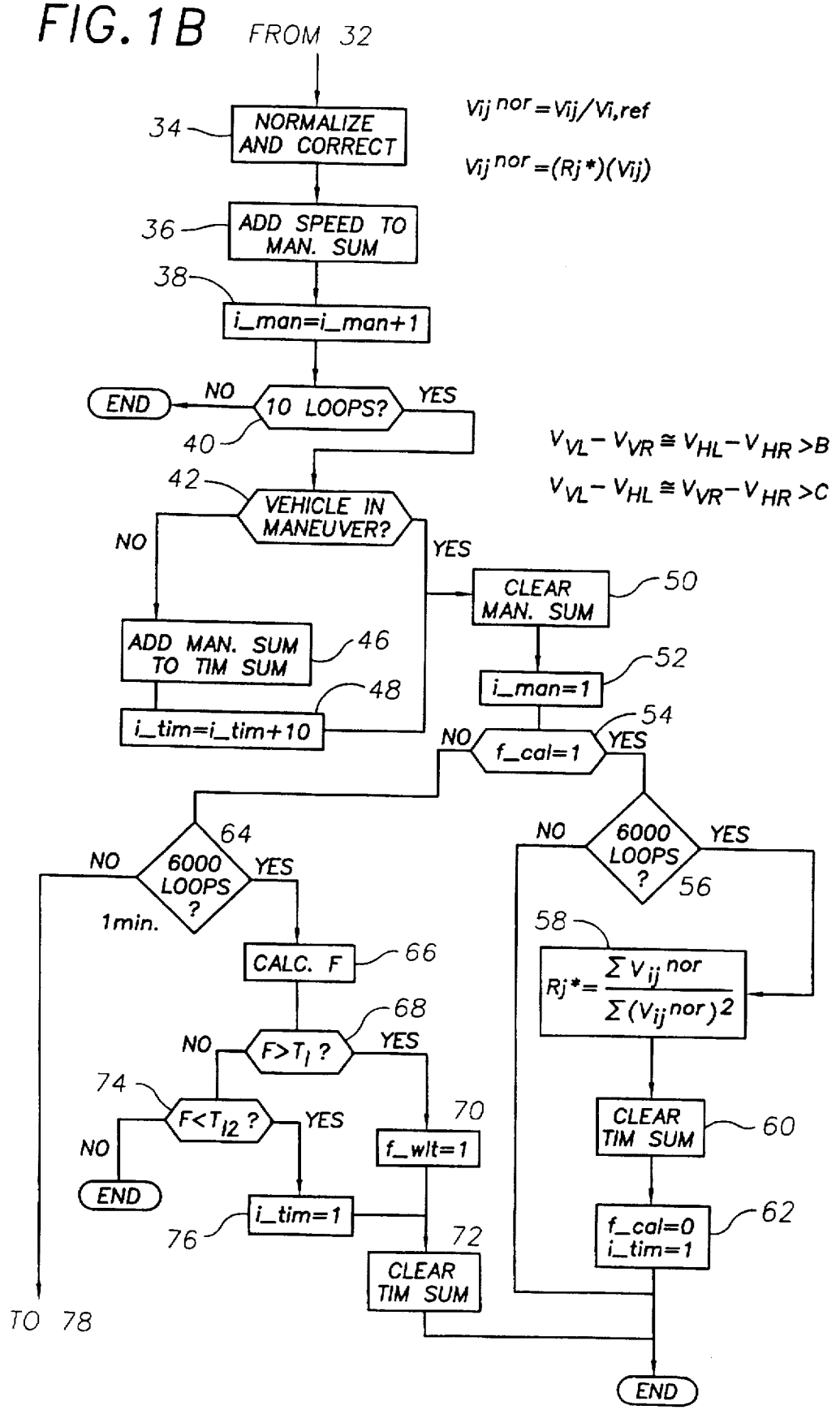

Referring to the flow chart represented in the figures, this represents a simplified rendition of a computer program which can be used to practice the method according to the invention.

Throughout the program, wheel speeds are read in from the wheel speed sensors at each of the four wheels at 10 milli-second intervals. These wheel speed values, which are all normalized as described above, are used both in a calibration procedure wherein built-in variations are determined, and the ensuing F-value routine wherein deflation is checked at three levels of pressure loss. When deflation is detected, it is assumed that the driver will take remedial action to render the tire pressures uniform. On doing this, he can reset the system by pushing a reset button. This can be done any time re-calibration is desired, such as after a wheel alignment or fitting new tires.

Whenever the system is reset, the various flags and counters used in the program are initialized (block 10). Setting the calibration flag (f_cal=1) indicates that the reset button has been pushed and the calibration is to proceed. Setting the warning light flag (f_wlt=1) turns on the warning light setting, the brake light switch flag (f_bls=0) indicates lack of brake pressure. This switch is wired in parallel with the brake lights. Setting the tire inflation monitoring counter (i_tim=1) and the maneuver counter (i_man=1) starts these counters at zero.

Following initialization, reading of wheel speeds begins (block 12). As each set of four values is read, the calibration and warning light flags are checked (block 14). If both are set, this is a clear indication that the program is starting the calibration loop, and the warning light is turned off (block 16), the calibration factors are set at 1 (block 18) and the maneuver and tire inflation monitoring sums are cleared (block 20). If the warning light flag is set and the system is not in calibration (block 22) this is a clear indication that low tire pressure has been detected, and the program is terminated. It is now up to the driver to put air in the tires, and reset the system.

If the warning light is off and the system is not in the calibration loop (answer "no" in block 22), then the wheel speed values are run thru several filtering steps to eliminate values which cannot be used for a reliable tire inflation check. Block 24 checks for ABS failure, which is determined externally by the ABS control module so that the ABS shuts down, and automatic regulation of brake pressure is eliminated. Block 26 checks for presence of a spare tire, which is detected when one wheel speed is significantly faster than other wheel speeds. Block 28 filters out wheel speeds which occur when the vehicle is moving especially slow (below 10 kph) or especially fast (above 200 kph). If any of the above checks is positive, the tire inflation monitoring step is bypassed. Following this, block 30 checks for braking, and disregards values when the brake light switch is on. If braking is not present, the wheel speed values are checked for abrupt positive or negative changes (block 32), which would indicate wheel noise. That is, block 32 only passes wheel speed values when $dv_j/dt$ is within limits which correspond to limits of wheel acceleration and deceleration.

Referring now to FIG. 1B, following the preliminary filtering of FIG. 1A, the wheel speed values are normalized and corrected in block 34. Note that if the calibration loop has not yet been completed, all rolling radii $R_j^*$ are still set at 1. Following normalization and correction, the wheel speeds are added to the respective maneuver sums (block 36) and the maneuver counter is incremented. The maneuver loop is a 10 loop (100 ms) cycle which is run at all times, to check if the vehicle is in a maneuver. When 10 loops are completed (block 42), a maneuver check is performed (block 42), wherein the difference between the speeds of the front wheels is compared with the difference between the speeds of the rear wheels. If there are significant differences and they are comparable, the maneuver sum is cleared (block 50) and the maneuver counter is reset (block 52). If the differences are not significant, the maneuver sum is added to the tire inflation monitoring sum (block 46) and the TIM counter is incremented by 10 (block 48). Following this incrementing of the TIM sum and counter, the MAN sum is cleared (block 50) and the maneuver counter is reset (block 52). Block 54 then checks whether calibration is complete, i.e., whether the calibration flag is reset.

Uphill/downhill travel can also be checked for in block 42 by comparing the difference in speeds of the left side wheels to the difference in speeds of the right side wheels. If there are significant differences and they are comparable, uphill/downhill travel (or vehicle acceleration/deceleration) is indicated, and the maneuver sum is cleared, the same as when the vehicle is cornering. This check is based on the fact that driven wheels turn faster than non-driven wheels when the vehicle is accelerating or traveling uphill at constant speed. Likewise, driven wheels turn slower than non-driven wheels when the vehicle is decelerating or travelling downhill at constant speed.

Calibration following a reset requires 6000 filtered wheel speed readings. Thus, if the calibration flag is set, block 56 asks whether 6000 loops have been completed (i_tim=6001) If no, additional wheel speeds are read in. If yes, the rolling radii $R_j^*$ are calculated from the normalized speed values in block 58. The TIM sum is cleared in block 60, because data have been for calibration, and tire inflation monitoring has not yet begun. Finally, the calibration flag is set to zero and the TIM counter is reset (block 62). Tire inflation monitoring is now ready to begin, which is indicated by f_cal=0 in block 54.

Three levels of pressure loss can be detected with increasing detection time. The first step of tire inflation monitoring following calibration requires 6000 loops. When 6000 loops have been completed (block 64) the F-value is calculated in block 66 according to the modified analysis of the variance method mentioned in the summary, i.e., by the calculation:

$$SUMV_j = \sum_{i=1}^{n} (V_{ij}) \text{ and}$$

$$SUM2V_j = \sum_{i=1}^{n} (V_{ij}^2)$$

$$X = SUMV_1 + SUMV_2 + SUMV_3 + SUMV_4$$

$$SSC = \sum_{j=1}^{4} (4SUMV_j - X)^2$$

$$SSR = \sum_{j=1}^{4} (SUM2V_j) - \sum_{j=1}^{4} (SUMV_j)^2$$

$$F = SSC/SSR.$$

Figure 2:
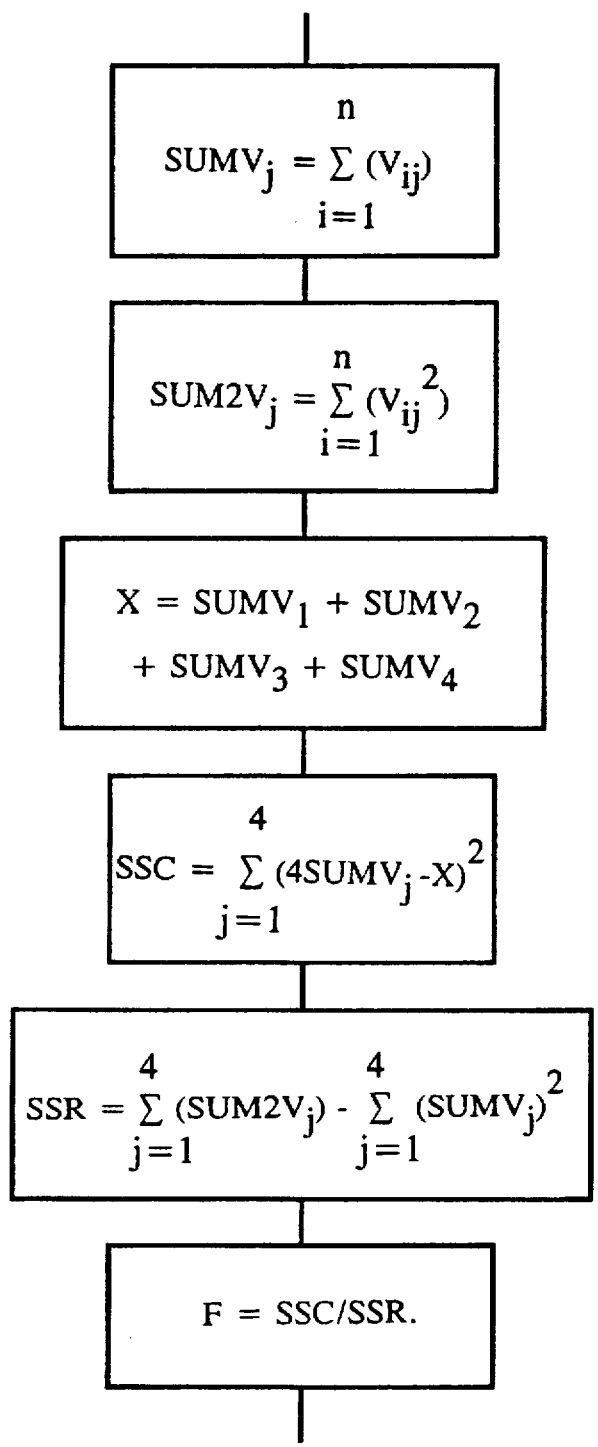
FIG. 2 shows a more detailed flowchart of the calculation of the F-value.

See FIG. 2, wherein the calculation of the F-value is shown in greater detail. The F-value is compared with an empirically determined threshold $T_1$ which is known to correspond to a given loss of air pressure, e.g., 50% (block 68). Thus, if the manufacturer's suggested tire pressure is 36 psi, a value $T_1$ is predetermined by calculating an F value when one of the tires is at 18 psi. When F is greater than $T_1$, a 50% loss of pressure is determined, and the warning light is activated (block 70). The TIM sum is cleared (block 72), and the program proceeds to "end". That is, wheel speed values will continue to be read in, but will not be used in this sub-routine. Recall that for a given sample set, the larger the F value, the bigger the possible pressure loss. The bigger the sample (longer time), the more reliable F becomes to determine a pressure loss. If the F-value does not exceed the threshold $T_1$, a further check is made to see if F is less than a smaller value (subthreshold $T_{12}$) corresponding to a lesser pressure loss, e.g., 25%. In the given example, then, $T_{12}$ is empirically determined for a 6000 loop sample at a tire pressure of 27 psi. If F Is less than $T_{12}$ (answer "yes" in block 74), the TIM counter is reset (block 76). This means there is no chance of even a 25% loss. If F is above $T_{12}$ (answer "no" in block 74), this means there is a possibility of a pressure loss (25%<loss<50%) but more data are needed to make a reliable determination. In this case, the wheel speed values continue to be read in, but will not be used in this sub-routine.

If 6000 loops have been completed and the warning light is not on, the block 64 will answer "no" when 6001 wheel speed readings have been made. The first F value is only calculated when 6000 loops have been completed whereupon the TIM sums $$\sum_{i=1}^{n} V_{ij}$$

are calculated.

Figure 1C:
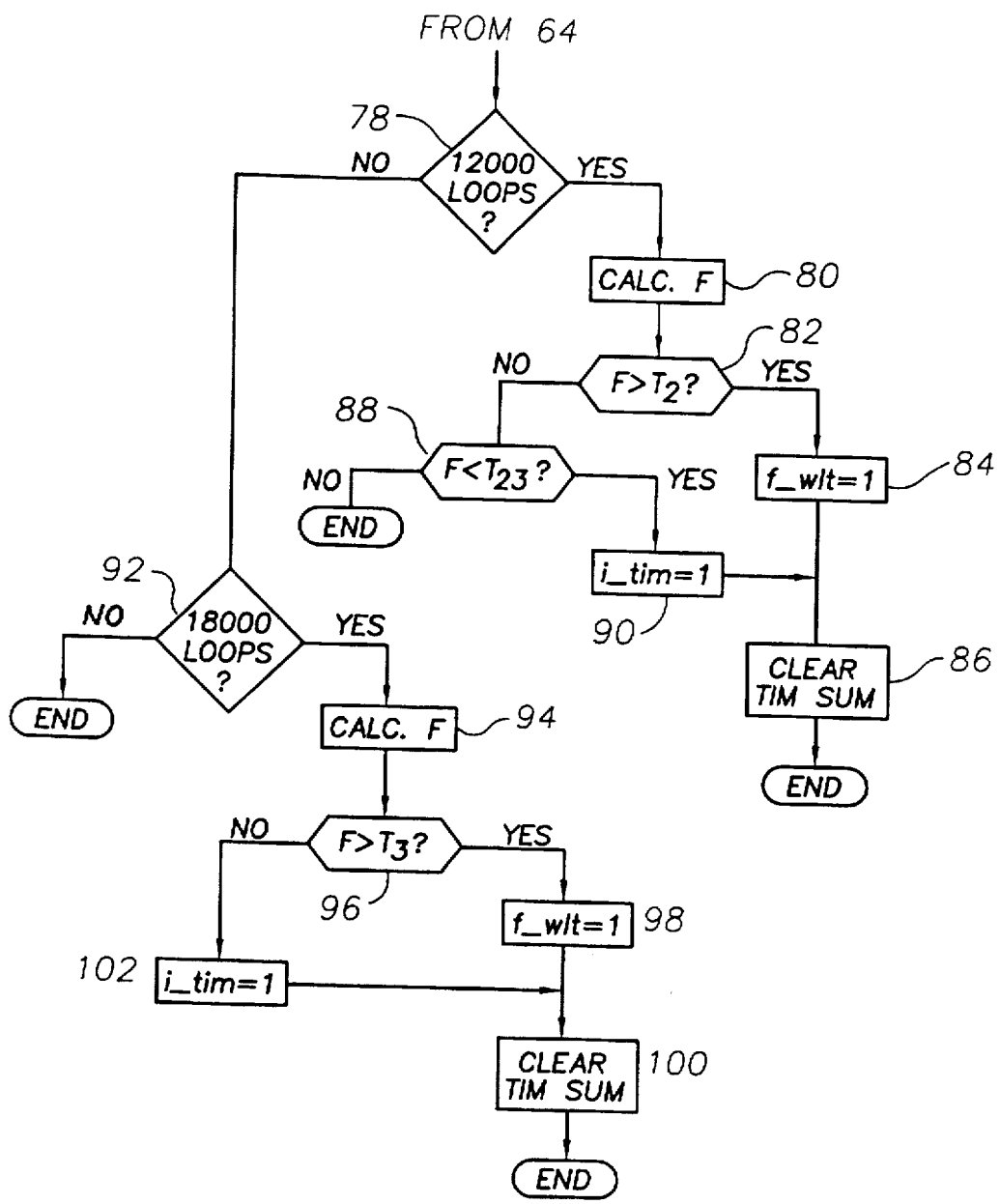

When there is a possible pressure loss of less than 50% but more than 25%, the program continues to collect wheel speed values, filter the values and run maneuver checks at all times. Referring to FIG. 1c, when 12000 sets of wheel speed values have been collected (il_tim=12001) indicated by a "yes" answer in block 78, the value F is once again calculated (block 80), and compared to a second predetermined threshold $T_2$ (block 82) which corresponds to a tire pressure loss of 33%. Note that this will not be the same as $T_{12}$, because $T_2$ is predetermined for 12000 loops, and the F-value changes as the sample size increases. If F exceeds $T_2$, the warning light in activated (block 84) and the TIM sum is cleared. If F does not exceed threshold $T_2$, a further check is made to see if F is less than a smaller value (subthreshold $T_{23}$) corresponding to a lesser pressure loss, e.g., 25%, with confidence based on 2 minute data. In the given example, then, $T_{23}$ is empirically determined for a 12000 loop sample at a tire pressure of 27 psi. If F is less than $T_{23}$ (answer "yes" in block 88), the TIM counter is reset (block 90). If F is above $T_{23}$ (answer "no" in block 88), the wheel speed values continue to be read in.

If 12000 loops have been completed and the warning light is not on, the block 78 will answer "no" when 12001 wheel speed readings have been made, and the TIM sums will continue to accumulate until the TIM counter reaches 18000 (i_tim=18001), as determined in block 92. At this point, the F value is once again calculated (block 94) and compared to a third predetermined threshold $T_3$ (block 96) which corresponds to a tire pressure loss of 25%. Note that this will not be the same as $T_{23}$, because $T_3$ is predetermined for 18000 loops. If F exceeds $T_3$, the warning light is activated (block 98) and the TIM sum is cleared (block 100). If F does not exceed $T_3$, the TIM counter is simply reset (block 102) so that the program will begin another 6000 loops necessary to check for a 50% pressure loss. 18000 loops, which corresponds to three minutes worth of filtered speed values, are not exceeded.

The program always checks for 50% loss first, so the driver will know as soon as possible if air is being lost at a high rate. If no speed values are filtered out for slippage and maneuvers, this takes one minute (6000 loops at 10 ms/loop). If 50% loss is not detected, the wheel speed data are either cleared so that a fresh 6000 (50% loss detection) loop can start or continue to accumulate for another 6000 loops (total 2 minutes) so that a check can be made for a 33% loss. If 33% loss is not detected, the wheel speed data are either cleared so that a fresh 6000 (50% loss detection) loop can start or continue to accumulate for another 6000 loops (total 3 minutes) so that a check can be made for a 25% loss. Where the same warning light is used for all levels of pressure loss, the driver won't know the extent of tire deflation, beyond knowledge that pressure is off by at least 25%. However, it is also possible to use three different lights or a sequence of flashes to indicate the degree of deflation.

We claim:

1. A method for detecting loss of pressure in a tire of a motor vehicle having four wheels and a tire on each wheel, said method comprising measuring the speeds $V_{ij}$ of each of the four wheels a plurality of times (n) in a first time interval, adding the plurality of speeds for each wheel to produce four wheel speed column sums $SUMV_j$ where $$SUMV_j = \sum_{i=1}^{n} V_{ij}$$

and j=1, 2, 3, 4, adding the four wheel speed column sums $SUMV_j$ to form a speed total X, forming a between column variation SSC based on the four column sums $SUMV_j$ and the speed total X, forming a between row variation SSR based on the four column sums $SUMV_j$ and the wheel speeds $V_{ij}$, forming a value F based on the ratio SSC/SSR, comparing F to a first predetermined threshold corresponding to a first predetermined pressure loss, and actuating a driver warning device when said F value exceeds said first predetermined threshold.

2. Method as in claim 1 wherein said between column variation SSC is formed by subtracting the speed total X from four times the column sum $SUMV_j$ for each wheel to form four deviations, squaring the deviations, and adding the squared deviations, whereby $$SSC = \sum_{j=1}^{4} (4SUMV_j - X)^2.$$

3. Method as in claim 1 wherein said between row variation SSR is formed by squaring the four column sums $SUMV_j$ and adding the squared column sums to form a total of squared column sums $$\sum_{j=1}^{4} (SUMV_j)^2,$$

squaring the measured speeds $V_{ij}$ of each of the four wheels, adding the squared speeds $(V_{ij})^2$ for each wheel to form four column sums of squared speeds $$SUM2V_j = \sum_{i=1}^{n} (V_{ij})^2,$$

and adding the column sums of squared speeds $SUM2V_j$ to form a total sum of squared speeds $$\sum_{i=1}^{4} (SUM2V_j), \text{ and}$$

subtracting said total of squared column sums from said total sum of squared speeds, whereby $$SSR = \sum_{j=1}^{4} (SUM2V_j) - \sum_{j=1}^{4} (SUMV_j)^2.$$

4. Method as in claim 1 wherein F=SSC/SSR.

5. Method as in claim 1 further comprising, when F does not exceed said first predetermined threshold, comparing F to a first predetermined sub-threshold which is smaller than said first predetermined threshold, measuring the speeds of each of the four wheels a plurality of times in a second time interval which is cumulative to said first time interval when F exceeds said first sub-threshold, forming said value F based on said plurality of measured wheel speeds in said second time interval, comparing said value F to a second predetermined threshold corresponding to a second predetermined pressure loss which is smaller than said first predetermined pressure loss, and actuating a driver warning device when F exceeds said second predetermined threshold.

6. Method as in claim 5 further comprising, when F does not exceed said second predetermined threshold, comparing F to a second predetermined sub-threshold which is smaller than second predetermined threshold, measuring the speeds of each of the four wheels a plurality of times in a third time interval which is cumulative to said second time interval when F exceeds said second sub-threshold, forming said value F based on said plurality of measured wheel speeds in said third time interval, comparing said value F to a third predetermined threshold corresponding to a third predetermined pressure loss which is smaller than said second predetermined pressure loss, and actuating a driver warning device when F exceeds said third predetermined threshold.

7. Method as in claim 1 further comprising determining wheel calibration factors for each of the four wheels prior to said first time interval, said wheel calibration factors discounting variations in rolling radii of the four wheels, and modifying said wheel speeds by said wheel calibration factors during said first time interval and any subsequent time intervals.

8. Method as in claim 1 further comprising normalizing all measured wheel speeds, said normalizing comprising calculating a vehicle reference speed $V_{iref}$ and dividing each measured wheel $V_{ij}$ speed by said vehicle reference speed $V_{iref}$ to obtain a normalized wheel speed $V_{ij}^{nor}$.

9. Method as in claim 8 wherein said vehicle reference speed is the average of the angular speeds of the four wheels times a virtual tire radius.

10. Method as in claim 8 further comprising measuring the speeds of each of the four wheels a plurality of times (m) prior to said first time interval, determining wheel calibration factors for each of the four wheels prior to said first time interval, said wheel calibration factors each being determined as a rolling radius $R_j^*$ according to $$R_j^* = \sum_{i=1}^{m} V_{ij}^{nor} / \sum_{i=1}^{m} (V_{ij}^{nor})^2, \text{ and}$$

modifying said wheel speeds $V_{ij}$ by said wheel calibration factors $R_j^*$ during said first time interval and any subsequent time interval.

11. Method as in claim 1 further comprising determining when said vehicle is cornering, and excluding wheel speeds measured during cornering from steps used to form said value F.

12. Method as in claim 10 wherein cornering is determined by determining a difference between a speed of the left front wheel and a speed of the right front wheel, determining a difference between a speed of the left rear wheel and a speed of the right rear wheel, comparing the difference between the front wheel speeds to the difference between the rear wheel speeds, and determining that said vehicle is cornering when said differences are greater than a predetermined minimum and both within the same predetermined limits.

13. Method as in claim 1 further comprising determining when one of said wheels is accelerating or decelerating, and excluding wheel speeds measured when one of said wheels is accelerating or decelerating from steps used to form said F value.

14. Method as in claim 13 wherein accelerating and decelerating are determined by determining a time rate of change $dV_{ij}/dt$, determining that a wheel is accelerating when $dv_{ij}/dt$ exceeds a positive threshold, and determining that one of said wheels is decelerating when $dV_{ij}/dt$ falls below a negative threshold.

15. Method as in claim 1 further comprising determining when any of said vehicle is travelling uphill or downhill, and excluding wheel speeds measured when said vehicle is travelling uphill or downhill form steps used to form said value F.

16. Method as in claim 15 wherein uphill or downhill travel are determined by determining a difference between a speed of the left front wheel and a speed of the left rear wheel, determining a difference between a speed of the right front wheel and a speed of the right rear wheel, comparing the difference between the left wheel speeds to the difference between the right wheel speeds, and determining uphill or downhill travel when said differences are greater than a predetermined minimum and both within the same predetermined limits.

17. Method for detecting the loss of pressure in a tire of a motor vehicle having four wheels and a tire on each wheel, said method comprising measuring the speeds $V_{ij}$ of each of the four wheels a plurality of times (m) in a calibration time interval, determining wheel calibration factors four each of the four wheels based on said plurality (m) of measured speeds for each of said four wheels, said wheel calibration factors discounting variations in rolling radii of the four wheels, measuring the speeds $V_{ij}$ of each of the four wheels a plurality of times (n) in a first time interval subsequent to said calibration time interval, modifying said wheel speeds by said calibration factors during said first time interval and any subsequent time intervals, adding the plurality of speeds for each wheel to produce four wheel speed column sums $SUMV_j$ where $$SUMV_j = \sum_{i=1}^{n} V_{ij}$$

and j=1, 2, 3, 4, adding the four wheel speed column sums $SUMV_j$ to form a speed total X, forming a between column variation SSC based on the four column sums $SUMV_j$ and the speed total X, forming a between row variation SSR based on the four column sums $SUMV_j$ and the wheel speeds $V_{ij}$, forming a value F based on the ratio SSC/SSR, comparing F to a first predetermined threshold corresponding to a first predetermined pressure loss, and actuating a driver warning device when said F value exceeds said first predetermined threshold.

* * * * *

UNITED STATES PATENT AND TRADEMARK OFFICE
CERTIFICATE OF CORRECTION

PATENT NO. : 5,760,682
DATED : June 2, 1998
INVENTOR(S) : Liu et al.

It is certified that error appears in the above-identified patent and that said Letters Patent is hereby corrected as shown below:

In column 4, line 18, after "Detection" add -- : --.

In column 4, line 30, after "(100 ms)" add -- . --.

In column 7, line 4, change "Is" to -- is --.

In column 7, line 26, after "(i" delete "I".

Signed and Sealed this

Eighteenth Day of May, 1999

Attest:

Q. TODD DICKINSON

Attesting Officer    Acting Commissioner of Patents and Trademarks